(12) United States Patent
Mundy et al.

(10) Patent No.: US 8,543,279 B2
(45) Date of Patent: Sep. 24, 2013

(54) SYSTEM AND METHOD FOR DETECTING AND RESPONDING TO PRESSURE LOSSES IN A HYDRAULIC AUTOMATIC TRANSMISSION

(75) Inventors: Scott E. Mundy, Carmel, IN (US); Jill Ann Hampton, Zionsville, IN (US)

(73) Assignee: GM Global Technology Operations LLC

( * ) Notice: Subject to any disclaimer, the term of this patent is extended or adjusted under 35 U.S.C. 154(b) by 406 days.

(21) Appl. No.: 12/730,530

(22) Filed: Mar. 24, 2010

(65) Prior Publication Data

US 2011/0112715 A1 May 12, 2011

Related U.S. Application Data

(60) Provisional application No. 61/259,792, filed on Nov. 10, 2009.

(51) Int. Cl.
*G01M 17/00* (2006.01)

(52) U.S. Cl.
USPC .......... 701/29.1; 701/29.2; 701/29.5; 701/51

(58) Field of Classification Search
None
See application file for complete search history.

(56) References Cited

U.S. PATENT DOCUMENTS

| 5,481,906 | A * | 1/1996 | Nagayoshi et al. | 73/114.61 |
| 6,357,289 | B1 * | 3/2002 | Futawatari | 73/115.02 |
| 2005/0221954 | A1 * | 10/2005 | Takagi | 477/156 |
| 2007/0232432 | A1 * | 10/2007 | Yoneyama | 475/119 |
| 2009/0157251 | A1 * | 6/2009 | Niwa et al. | 701/31 |

* cited by examiner

*Primary Examiner* — Fahd Obeid

(57) ABSTRACT

A control system for a hydraulic automatic transmission includes a fault detection module and a transmission diagnostic module. The fault detection module detects faults of components of the transmission, wherein the faults may indicate low hydraulic fluid pressure in the transmission or failure of one or more of the components. The transmission diagnostic module determines whether the faults are due to low hydraulic pressure based on the detected faults, a predetermined number of faults, and a plurality of conditions.

28 Claims, 5 Drawing Sheets

SYSTEM AND METHOD FOR DETECTING AND RESPONDING TO PRESSURE LOSSES IN A HYDRAULIC AUTOMATIC TRANSMISSION

CROSS-REFERENCE TO RELATED APPLICATIONS

This application claims the benefit of U.S. Provisional Application No. 61/259,792, filed on Nov. 10, 2009. The disclosure of the above application is incorporated herein by reference in its entirety.

FIELD

The present disclosure relates to internal combustion engines, and more particularly to a system and method for detecting and responding to pressure losses in a hydraulic automatic transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons. The pistons rotatably turn a crankshaft generating drive torque. The drive torque may be transferred to a driveline of a vehicle (e.g., wheels) via a transmission. The drive torque may also be translated (i.e., multiplied) by one of a plurality of gear ratios of the transmission. The transmission may be coupled to the crankshaft via a torque converter (e.g., a fluid coupling).

The transmission may include valves (e.g., spring-loaded valves), clutches, and one or more planetary gear sets. The transmission may also include a check balls and/or servos. The servos may actuate one or more of the clutches, and the clutches may engage one or more gears of the planetary gear sets. The transmission includes hydraulic fluid that controls one or more components of the transmission. The hydraulic fluid is typically supplied to the transmission from a main pump in the torque converter.

The hydraulic fluid flows through one or more of the valves depending on a pressure of the hydraulic fluid (e.g., spring-loaded valves with different spring rates). Alternatively, the valves may be actuated by electro-mechanical servos that are controlled by an external controller. The hydraulic fluid may also actuate servos to engage one or more of the clutches. Furthermore, each of the clutches may correspond to a gear of the planetary gear sets. Thus, the hydraulic fluid may engage one or more gears of the planetary gear sets (via a combination of the servos and the clutches) to achieve a desired gear ratio.

SUMMARY

A control system for a hydraulic automatic transmission includes a fault detection module and a transmission diagnostic module. The fault detection module detects faults of components of the transmission, wherein the faults may indicate low hydraulic fluid pressure in the transmission or failure of one or more of the components. The transmission diagnostic module determines whether the faults are due to low hydraulic pressure based on the detected faults, a predetermined number of faults, and a plurality of conditions.

A method for controlling a hydraulic automatic transmission includes detecting faults of components of the transmission, wherein the faults may indicate low hydraulic fluid pressure in the transmission or failure of one or more of the components, and determining whether the faults are due to low hydraulic pressure based on the detected faults, a predetermined number of faults, and a plurality of conditions.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
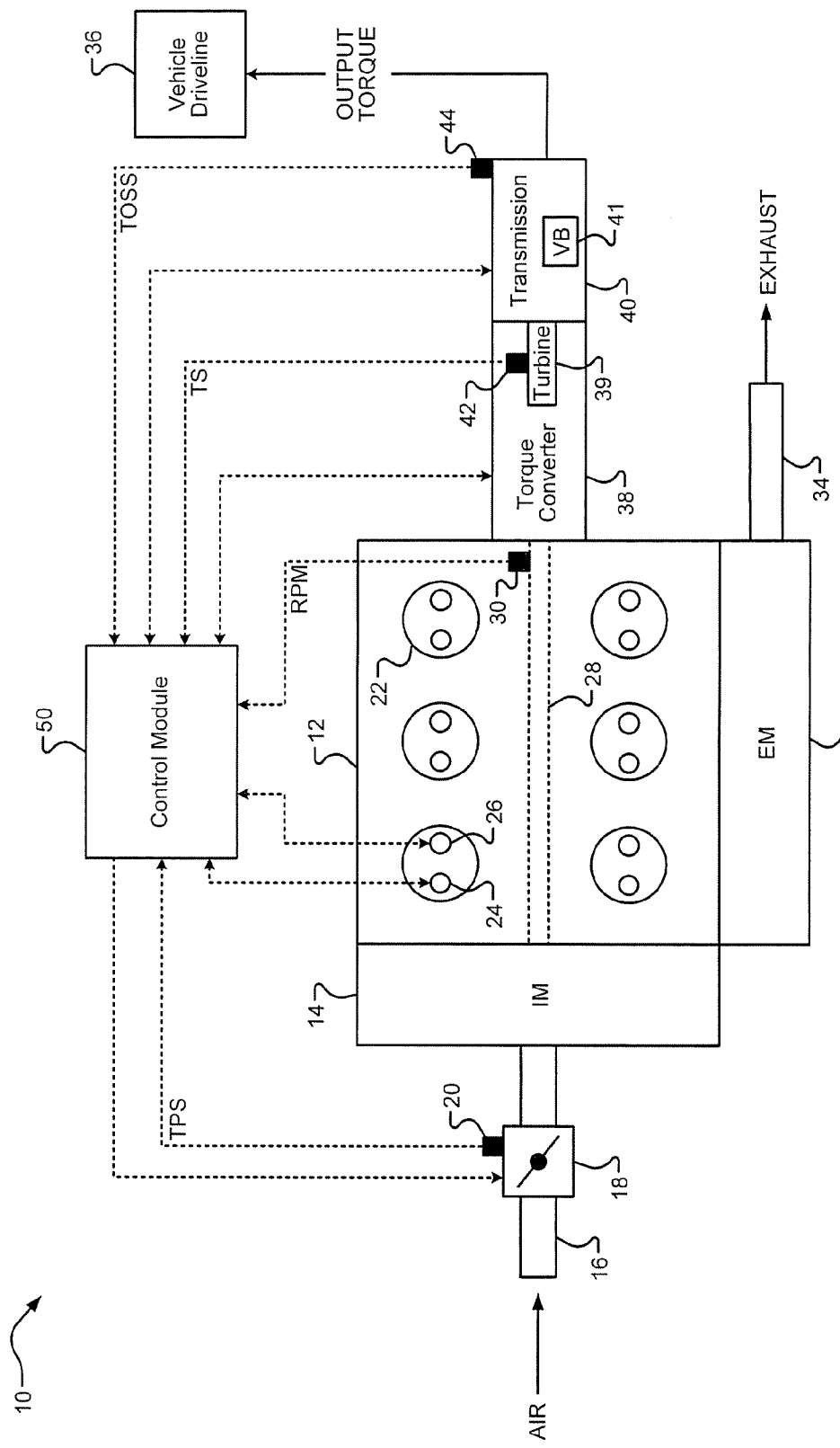
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional transmission control systems may detect faults of valves in a hydraulic automatic transmission. The transmission control systems may then determine that maintenance of the transmission is required when a valve has faulted. A valve fault may occur due to valve and/or solenoid failures. Alternatively, however, a valve fault may occur due to low hydraulic pressure in the transmission. Low hydraulic pressure, however, may be due to other conditions such as, but not limited to, a damaged suction filter, an improper amount of hydraulic fluid (e.g., an improper hydraulic fluid fill), and/or pressure drain from a torque converter due to loose seal rings. Thus, conventional transmission control systems may incorrectly detect valve faults due to low hydraulic fluid pressure. Incorrectly detecting valve faults may result in increased warranty costs due to improper valve body replacements and/or failing to fix an actual problem causing the low hydraulic fluid pressure.

Therefore, a system and method is presented that detects faults of components in a hydraulic automatic transmission and determines whether the faults are an indication of low hydraulic pressure or are actual component failures. Rather, the system and method waits to detect multiple faults before determining that the initial fault is an actual component failure. More specifically, the system and method may detect multiple valve faults or dropouts in the transmission. For example, the system and method may detect valve dropouts based on valve integrity and/or valve response time. Additionally or alternatively, however, the system and method may detect indications of low hydraulic pressure including a fault of a reverse pressure switch (RPS) and/or a "turbine speed flare" (TSF) indication. For example, the system and method may detect an RPS fault based on integrity of the RPS. Additionally, for example, the system and method may detect a TSF indication based on excessive fluctuation of a rotational speed of the transmission input shaft which is coupled to a turbine in a torque converter. TSF in either forward or reverse ranges, in conjunction with valve and/or RPS dropouts, indicates low hydraulic pressure. Similarly, multiple valve dropouts and/or RPS dropouts in neutral ranges may indicate low hydraulic pressure.

The system and method may then determine whether the detected faults are due to low hydraulic pressure. More specifically, the system and method may determine whether a predetermined number of faults indicating low hydraulic pressure are detected. For example only, the predetermined number of faults may be two. However, the system and method may require that a plurality of conditions are true when determining whether the initial fault is due to low hydraulic pressure. The plurality of conditions may include, but are not limited to (1) transmission range includes one of first gear, reverse, and neutral; (2) engine speed, turbine speed, transmission output shaft speed (TOSS), and throttle position are less than predetermined speed and position thresholds, respectively; and (3) the initial fault indicates low hydraulic pressure (i.e., consistent with low hydraulic pressure characteristics).

If the plurality of conditions are true at the initial fault, the system and method may determine whether the predetermined number of additional faults are detected during a predetermined period. More specifically, the system and method may determine that the initial detected fault is not due to low hydraulic pressure when less than the predetermined number of faults are detected during the predetermined period. Alternatively, however, the system and method may also determine that the initial detected fault is due to low hydraulic pressure when the predetermined number of additional faults are detected during the predetermined period. When low hydraulic pressure is detected, a neutral range reflecting the valve position at time of failure is commanded in all manual selection valve positions. The failure specific neutral range is commanded until recovery occurs or the plurality of recovery conditions disables the wait for possible recovery. Recovery may be defined as the detected faults disappearing (i.e., going away). When one or more of a plurality of recovery conditions occur during a period after low hydraulic pressure is detected, the system and method may stop waiting to recover from low hydraulic pressure. If recovery occurs, normal transmission operation may resume; however, if recovery does not occur, a transmission range consistent with low hydraulic pressure may be commanded and a low hydraulic pressure signal may be generated. In other words, the system and method may effectively detect low hydraulic pressure in the transmission, wait for recovery, stop waiting for recovery due to a plurality of conditions, and then respond with either normal operation or range consistent with low hydraulic pressure and signal low main pressure, without requesting maintenance (i.e., valve body replacement).

The plurality of recovery conditions may include, but are not limited to engine speed, turbine speed, TOSS, and throttle position greater than predetermined speed and position thresholds, respectively, and expiration of a calibrated period. The system and method may request valve maintenance when the required predetermined low hydraulic pressure indications do not occur during the period (i.e., the faults are not due to low hydraulic pressure). Alternatively, the system and method may determine that the transmission is suffering from low hydraulic pressure when the required predetermined low hydraulic pressure indications occur and one of the plurality of recovery conditions occur (i.e., the faults are due to low hydraulic pressure). For example, the system and method may generate a low hydraulic pressure signal to warn a driver of the vehicle and/or request maintenance.

Referring now to FIG. 1, an engine system 10 includes an engine 12. The engine 12 draws air into an intake manifold 14 through an inlet 16 that may be regulated by a throttle 18. A throttle position sensor (TPS) 20 may generate a TPS signal indicating a position of the throttle 18. The air in the intake manifold 14 may be distributed to a plurality of cylinders 22. While six cylinders are shown, the engine 12 may include other numbers of cylinders.

The air distributed to the cylinders 22 may be mixed with fuel from a plurality of fuel injectors 24 to create an air/fuel (A/F) mixture. For example, the fuel injectors 24 may inject fuel into intake ports of the cylinders 22, respectively (i.e., port fuel injection). Alternatively, the fuel injectors 24 may inject fuel directly into the cylinders 22, respectively (i.e., direct fuel injection).

The A/F mixture in the cylinders 22 may be compressed by pistons (not shown) and ignited by spark from a plurality of spark plugs 26, respectively (i.e., spark ignition combustion). Additionally or alternatively, the A/F mixture may be compressed until a critical temperature and/or pressure is reached resulting in automatic ignition (i.e., homogeneous charge compression ignition, or HCCI combustion, or compression ignition combustion, such as a diesel engine).

The combustion of the A/F mixture in the cylinders 22 drives pistons (not shown). The pistons (not shown) rotatably turn a crankshaft 28 generating drive torque. An engine speed sensor 30 generates an engine speed signal (RPM) indicating a rotational speed of the crankshaft 28 (e.g., in revolutions per minute, or RPM). Exhaust gas resulting from combustion is expelled from the cylinders 22 of the engine 12 through an exhaust manifold 32. The exhaust gas may be treated by an exhaust treatment system 34 to reduce emissions before being released into the atmosphere.

The generated drive torque may be transferred from the crankshaft 28 to a vehicle driveline 36 (e.g., wheels) via a torque converter 38 and/or a transmission 40. The torque converter 38 may couple the crankshaft 38 to the transmission 40. For example, the torque converter 38 may include a hydraulic fluid coupling and the transmission 40 may include a hydraulic automatic transmission. A turbine speed (TS) sensor 42 may generate a TS signal indicating a rotational speed of a turbine 39 in the torque converter 38. For example, the TS sensor 42 may also measure a rotational speed of an input shaft of the transmission 40.

The transmission 40 may include one or more planetary gear sets for achieving a desired gear ratio. A valve body (VB) 41 in the transmission 40 may include a plurality of valves that control the flow of hydraulic fluid to actuate various components of the transmission 40. For example, the various components of the transmission 40 may include, but are not limited to clutches, servos, switches, etc.

The transmission 40 may multiply the drive torque from the crankshaft 28 (via torque converter 38) by the desired gear ratio and output the multiplied drive torque to the vehicle driveline 36. A transmission output shaft speed (TOSS) sensor 44 may generate a TOSS signal indicating a rotational speed of an output shaft (not shown) of the transmission 40. For example, the TOSS may correspond to a rotational speed of the vehicle driveline 36 (e.g., the wheels).

A control module 50 controls operation of the engine system 10. More specifically, the control module 50 may control the throttle 18, the fuel injectors 24, the spark plugs 26, the torque converter 38, and the transmission 40. The control module 50, however, may also control other components of the engine system 10. The control module 50 may also receive signals from the TPS sensor 20, the RPM sensor 30, the TP sensor 42, and the TOSS sensor 44. The control module 50, however, may also receive signals (i.e., measurements) from other sensors indicating various other engine operating parameters. The control module 50 may also implement the system and/or method of the present disclosure.

Figure 2A:
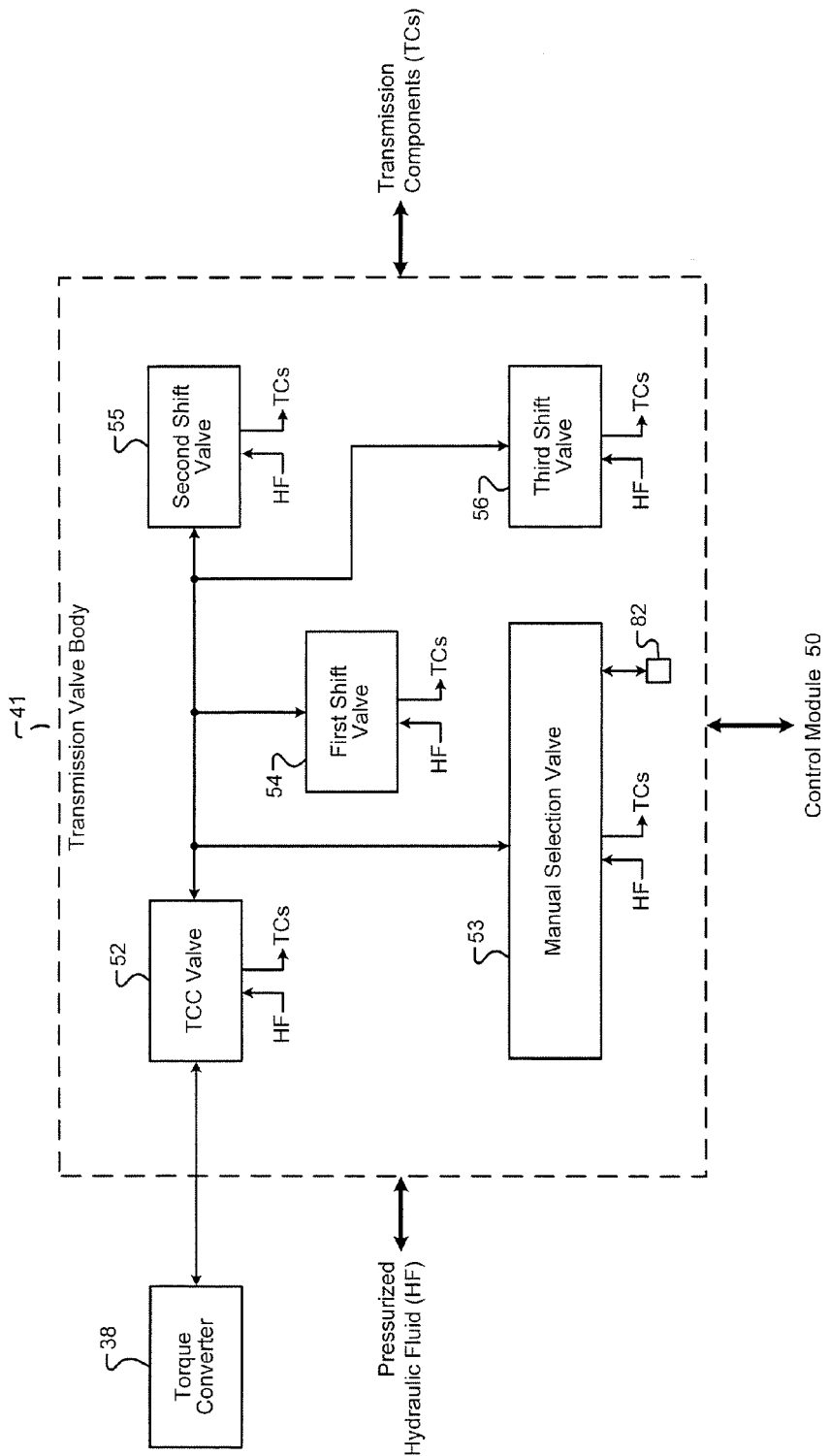
FIG. 2A is a schematic of hydraulic fluid flow in an exemplary hydraulic transmission according to the present disclosure.

Referring now to FIG. 2A, flow of hydraulic fluid between valves in the valve body 41 of the transmission 40 is shown in more detail. The valve body 41 receives pressurized hydraulic fluid (HF). For example, the valve body 41 may receive the pressurized HF from a main pump in the torque converter 38. However, the valve body 41 may also receive the pressurized HF from another pump or engine component. The valve body 41 may also communicate with the control module 50. More specifically, for example, the control module 50 may control and/or diagnose faults of various components of the valve body 41.

The valve body 41 may include a torque converter clutch (TCC) valve 52, a manual selection valve 53, a first shift valve 54, a second shift valve 55, a third shift valve 56, and a reverse pressure switch (RPS) 82. While five valves 52-56 are shown, the valve body 41 may include other numbers of valves. More specifically, for example, the valve body 41 may include other numbers of shift valves. Specifically, for example, the TCC valve 52 may communicate with (i.e., provide for actuation of) a clutch in the torque converter 38.

The valves 52-56 collectively represent a plurality of paths that the HF may flow through the valve body 41 to actuate various transmission components (TCs). For example, the TCs may include, but are not limited to servos, clutches, etc. In other words, one or more of the valves 52-56 may be opened to allow the HF to flow to and actuate one or more of the TCs (e.g., a clutch). For example only, the valves 52-56 may be spring-loaded valves with different spring rates, and thus each of the valves 52-56 may be opened depending on a pressure of the HF. Alternatively, for example only, the valves 52-56 may be electronically controlled, such as via the control module 50.

The RPS 82, on the other hand, indicates a status of the manual selection valve 53. More specifically, when the manual selection valve 53 is in forward or neutral, the RPS 82 may be in a first state ("ON"). On the other hand, when the manual selection valve 53 is in reverse, the RPS 82 may be in a second state ("OFF"). Therefore, the control module 50 may determine the status of the manual selection valve 53 by communicating with the RPS 82.

The control module 50, however, may also detect valve faults. More specifically, the control module 50 may detect faults of one or more of the valves 52-56 based on integrity (i.e., pressure drop across) and/or response of the valves 52-56. The integrity of a valve may be based on a pressure drop across the valve when the valve is closed. Thus, for example, the control module 50 may detect a fault of one of the valves 52-56 when a pressure drop across the valve is greater than a predetermined pressure drop corresponding to an integrity threshold (i.e., a pressure leak). The response of a valve may be based on an amount of time between commanding the valve open and the valve opening. The commanding of the valve may be via pressurized hydraulic fluid or via an electronic signal. Thus, for example, the control module 50 may detect a fault of one of the valves 52-56 when a response of the valve is greater than a response threshold (i.e., a damaged or clogged valve). In addition, the control module 50 may detect faults of the RPS 82 based on integrity of the RPS 82. The integrity of the RPS 82 may be based on the position of the RPS 82 relative to the manual selection valve 52. When the control module 50 determines that the RPS 82 is OFF (i.e., in the second state) and the manual selection valve 53 is in either forward or neutral, a low hydraulic pressure condition may exist or an RPS integrity condition may exist.

Figure 2B:
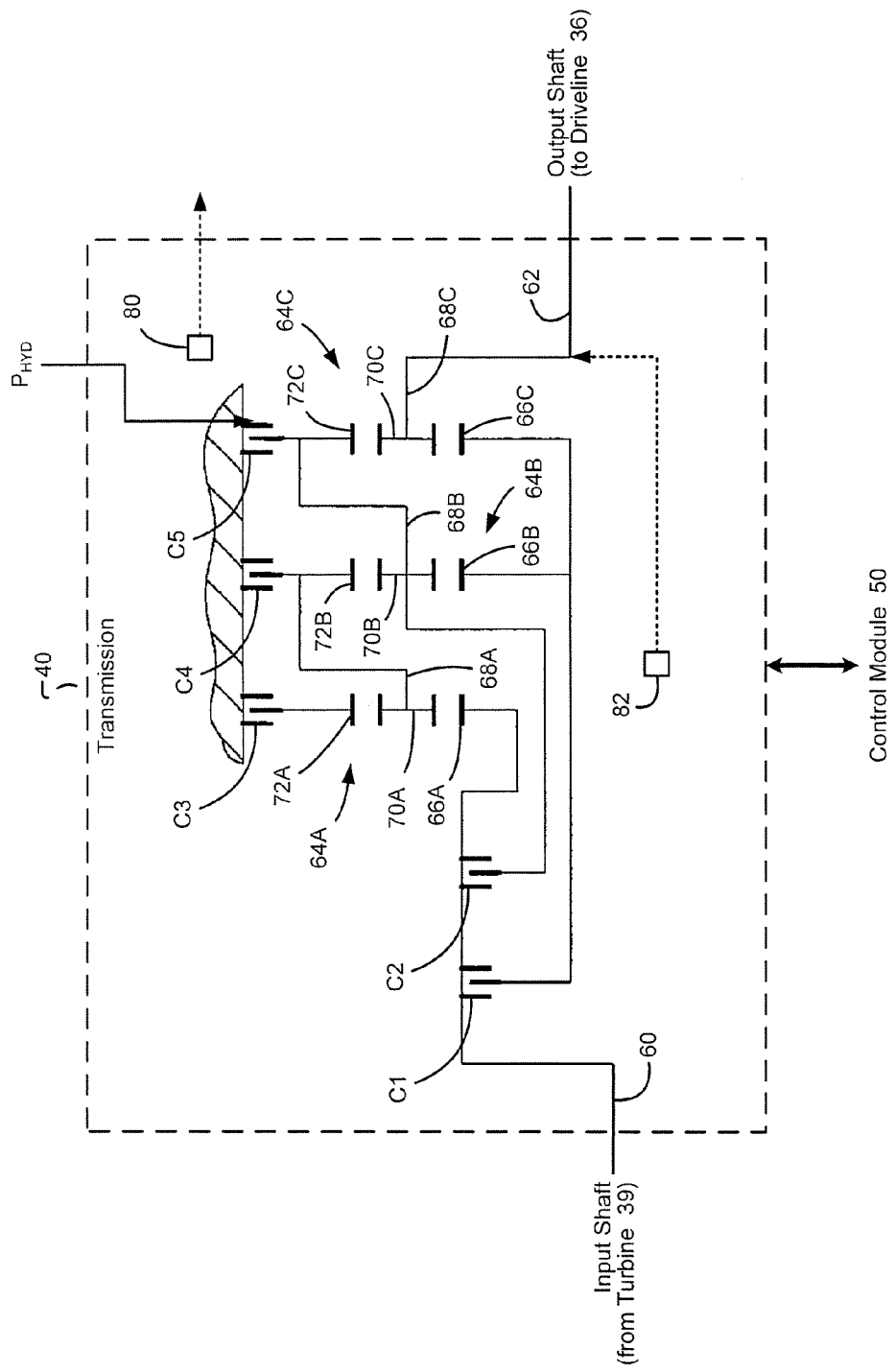
FIG. 2B is a schematic of mechanical linkage in the exemplary hydraulic transmission according to the present disclosure.

Referring now to FIG. 2B, mechanical linkage between the various components of the transmission 40 is shown in more detail. In other words, FIG. 2B does not show the flow of HF through the valves 52-56 of the valve body 41 (see FIG. 2A). In one embodiment, the transmission 40 may be a six-speed automatic transmission as shown. However, it can be appreciated that various other transmissions may also be implemented, such as different types of transmissions and transmissions that include different numbers of gears. For example only, the transmission may be a dual clutch transmission. The transmission 40 may also communicate with the control module 50. More specifically, for example, the control module 50 may control and/or diagnose faults of various components of the transmission 40.

The transmission 40 includes an input shaft 60, an output shaft 62 and three interconnected planetary gear sets 64A, 64B and 64C, respectively. For example, the input shaft 60 may be driven by a turbine of the torque converter 38. Accordingly, the rotational speed of the input shaft 60 may equal the turbine speed measured by the TS sensor 42. Similarly, the TOSS sensor 44 may measure the rotational speed of the output shaft 62 of the transmission 40.

The planetary gear sets 64A, 64B, and 64C include respective sun gears 66A, 66B, and 66C, carriers 68A, 68B, and 68C, planetary gears 70A, 70B, and 70C and ring gears 72A, 72B, and 72C. The transmission 40 further includes clutches C1-C5 that are selectively engaged to establish a desired gear ratio of the transmission 40. More specifically, the input shaft 60 continuously drives the sun gear 66A of the gear set 64A, selectively drives the sun gears 66B, 66C of the gear sets 64B, 64C via the clutch C1 and selectively drives the carrier 68B of the gear set 64B via the clutch C2. The ring gears 72A, 72B, and 72C of the gear sets 64A, 64B, and 64C are selectively grounded via the clutches C3, C4 and C5, respectively.

Hydraulic pressure ($P_{HYD}$) is selectively provided to the various clutches to regulate engagement of the clutches. In other words, the pressure $P_{HYD}$ may allow the HF to flow through particular valves of the valve body 41 and engage corresponding clutches. A pressure switch 80 may be associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) may be controlled to provide six forward speed ratios (1, 2, 3, 4, 5, and 6), a reverse speed ratio (R), or a neutral condition (N).

TABLE 1

|  | C1 | C2 | C3 | C4 | C5 |
|---|---|---|---|---|---|
| $1^{st}$ | X |  |  |  | X |
| $2^{nd}$ | X |  |  | X |  |
| $3^{rd}$ | X |  | X |  |  |
| $4^{th}$ | X | X |  |  |  |
| $5^{th}$ |  | X | X |  |  |
| $6^{th}$ |  | X |  | X |  |
| R |  |  | X |  | X |
| N |  |  |  |  | X |

For example, the second forward speed ratio (i.e. $2^{nd}$ gear) is established when clutches C1 and C4 are engaged. Shifting from one speed forward speed ratio to another may generally be achieved by disengaging one clutch (i.e., the off-going clutch) while engaging another clutch (i.e., the on-coming clutch). For example, the transmission 40 may be downshifted from second gear to first gear by disengaging clutch C4 while engaging clutch C5.

Additionally, the RPS 82 may transition between an indication of forward or neutral position of the manual selection valve 53 and reverse position of the manual selection valve 53. In other words, for example, the RPS 82 may be in the ON state (i.e., the first state) to indicate that the manual selection valve 53 is in either forward or neutral. However, the RPS 82 may transition to the OFF state (i.e., the second state) to indicate that the manual selection valve 53 is in reverse. The manual selection valve 53 is controlled via input from a driver of the vehicle (e.g., a shift lever), and the RPS 82 reflects the state of the manual selection valve 53. The RPS 82 does not reflect transmission range.

The control module 50, however, may also perform RPS diagnostics and detect TSF indication. More specifically, the control module 50 may detect faults of the RPS 82 based on integrity of the RPS 82. The integrity of the RPS 82 may be based on a pressure required to actuate the RPS 82 and the position of the manual selection valve 53. Thus, for example, the control module 50 may detect an integrity fault of the RPS 82. An RPS integrity fault may occur when the manual selection valve 53 is in forward or neutral and the RPS 82 transitions from the ON state to the OFF state. An RPS integrity fault may also occur when the manual selection valve 53 is in reverse and the RPS 82 transitions from the OFF state to the ON state. Additionally, the control module 50 may detect a TSF indication when the TS (i.e., the rotational speed of the input shaft) varies by more than a predetermined amount during a predetermined period.

Figure 3:
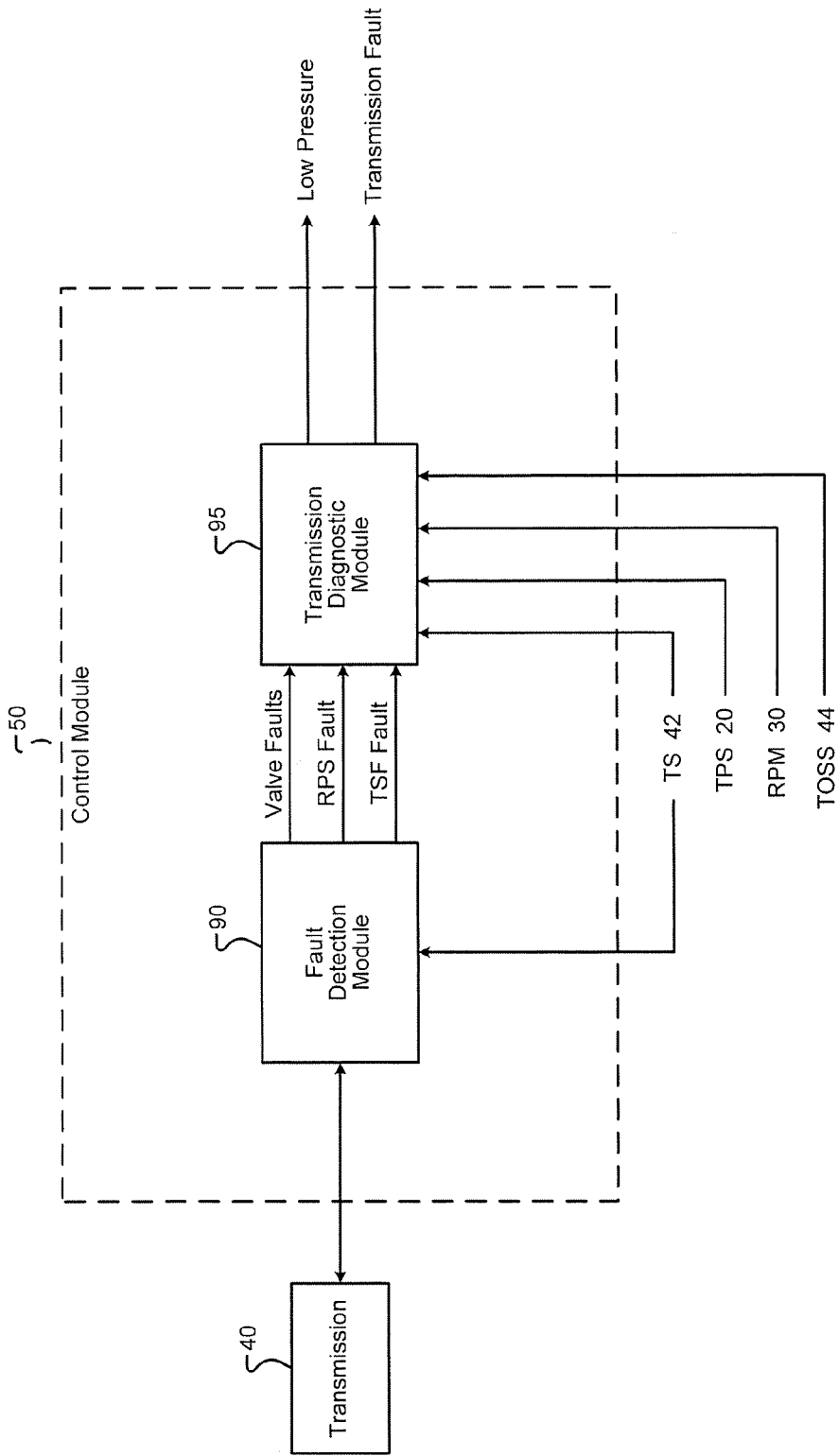
FIG. 3 is a functional block diagram of an exemplary control module according to the present disclosure.

Referring now to FIG. 3, the control module 50 is shown in more detail. The control module 50 may include a fault detection module 90 and a transmission diagnostic module 95. While one fault detection module 90 is shown, the control module 50 may include multiple fault detection modules that each detect a different type of fault (e.g., valve faults, RPS integrity fault, TSF indication, etc.)

The fault detection module 90 communicates with the transmission 40 and detects faults of the various components of the transmission 40. More specifically, the fault detection module 90 may detect valve faults based on integrity and/or response of the valves 52-56 as described with respect to FIG. 2A. Additionally or alternatively, the fault detection module 90 may determine an RPS fault based on integrity of the RPS 82 and/or or a TSF indication as described with respect to FIG. 2B.

The transmission diagnostic module 95 receives the detected faults from the fault detection module 90. The transmission diagnostic module 95 may also receive throttle position from the TPS sensor 20, engine speed from the RPM sensor 30, and turbine speed from the TS sensor 42. The transmission diagnostic module 95 may also receive other signals indicating other engine and transmission operating parameters (e.g., speeds, pressures, temperatures, etc.)

The transmission diagnostic module 95 determines whether detected faults are misdiagnosed due to low hydraulic pressure in the transmission 40. In other words, the transmission diagnostic module 95 may determine whether detected faults are actual faults or whether the detected faults are due to low hydraulic pressure in the transmission 40. Therefore, the transmission diagnostic module 95 may generate either a low pressure signal or a transmission fault signal.

The low pressure signal may indicate that detected faults in the transmission 40 are due to low hydraulic pressure. For example, the low pressure signal may warn the driver that maintenance is required to correct the low pressure (i.e., pressure leak) in the transmission 40. Alternatively, the transmission fault signal may indicate that detected faults in the transmission 40 are actual faults. In other words, for example, the transmission fault signal may indicate that maintenance (or replacement) of the valve body 41 is required to correct the valve faults or RPS integrity fault.

First, if the plurality of conditions are true when the initial fault is detected, the transmission diagnostic module 95 may wait until a predetermined number of faults are detected. For example, the predetermined number of faults may be two. In other words, waiting for more than one detected fault may prevent misdiagnosis (i.e., increase robustness) that may lead to unnecessary maintenance (and thus increased warranty costs). In one embodiment, the transmission diagnostic module 95 may then determine that the detected faults are actual faults (i.e., not misdiagnosed due to low pressure). Thus, for example, the transmission diagnostic module 95 may generate the transmission fault signal while waiting for the predetermined number of faults. If the predetermined period has elapsed before the predetermined number of faults are detected, the transmission fault signal may be generated.

Alternatively, however, the transmission control module 95 may detect the predetermined number of faults within the predetermined period. More specifically, when the plurality of conditions are true, the transmission control module 95 may determine that the initial failure is due to low hydraulic pressure in the transmission 40 rather than a component failure because the predetermined number of additional faults occurred within the predetermined period. The plurality of conditions for whether to consider the initial failure a result of low hydraulic pressure includes a transmission range of first, neutral, or reverse, engine speed, turbine speed, TOSS less than a calibration, and a fault symptomatic of low hydraulic pressure.

Thus, the transmission control module 95 may generate the low pressure signal when the predetermined number of faults are detected and recovery does not occur during a predetermined period while the manual selection valve 53 is in neutral position. Likewise, if low hydraulic pressure is detected while the manual selection valve 53 is in either reverse or forward positions, the low pressure signal may set by the transmission control module 95. The wait for recovery continues until one of the plurality of recovery conditions occur regardless of whether the transmission control module 95 has generated a low pressure signal. The plurality of recovery conditions include recovery of low hydraulic pressure, engine speed, turbine speed, TOSS, throttle position, and/or elapsed time greater than thresholds, respectively. The low pressure signal may be used to warn the driver (e.g., via a malfunction indicator lamp, or MIL). The driver may then take the vehicle to diagnose and repair the low pressure in the transmission 40 (i.e., a pressure leak).

Figure 4:
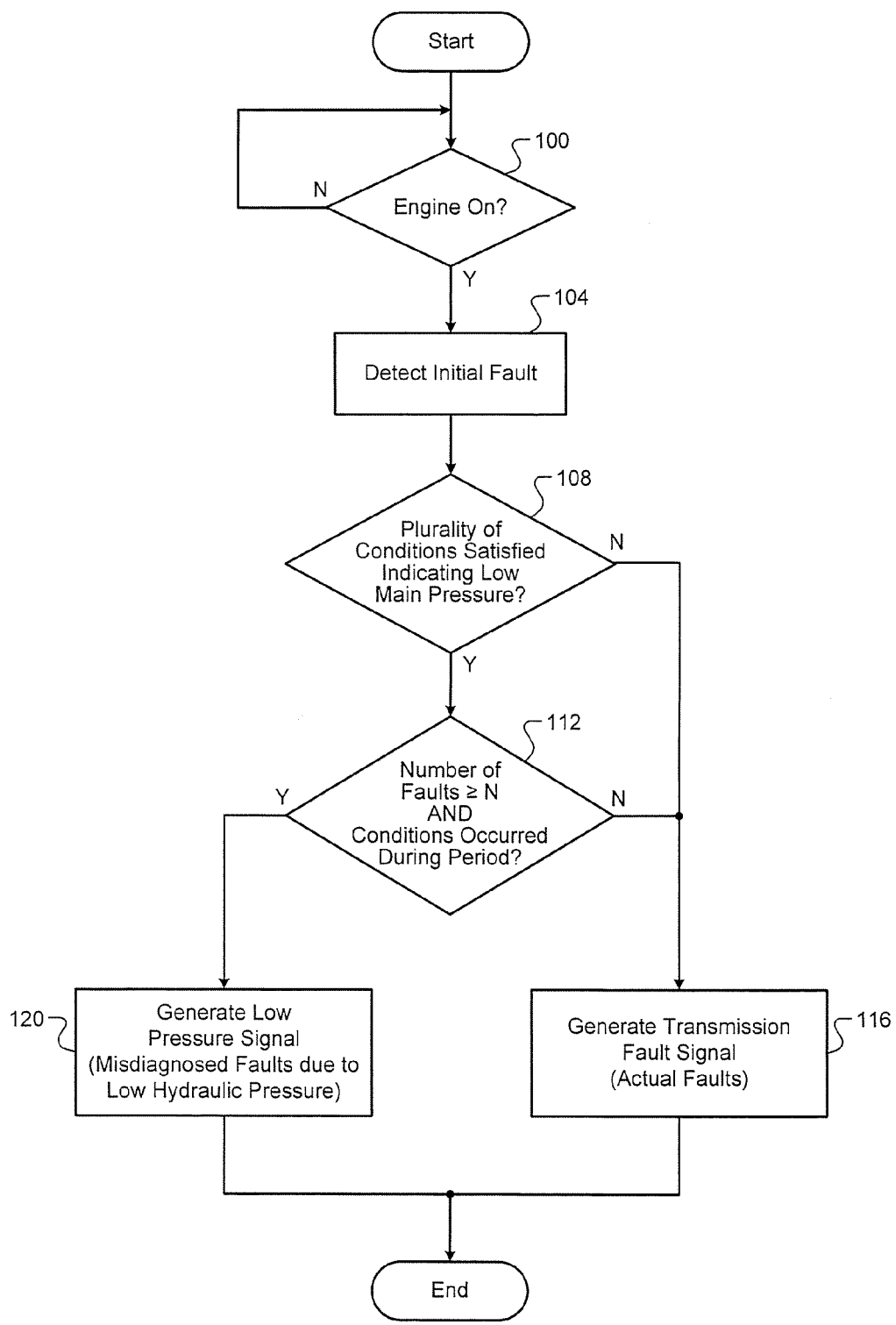
FIG. 4 is a flow diagram of an exemplary method for detecting and responding to pressure losses in the hydraulic automatic transmission according to the present disclosure.

Referring now to FIG. 4, a method for detecting and responding to pressure losses in a hydraulic automatic transmission begins at 100. At 100, the control module 50 determines whether the engine 12 is on. If true, control may proceed to 104. If false, control may return to 100.

At 104, the control module 50 may detect faults. For example, the faults may include one or more of valve faults, an RPS integrity fault, and a TSF indication. At 108, a plurality of conditions are examined to determine whether the initial fault may be a symptom of low main pressure. If true, control may proceed to step 112. If false, control may proceed to 116.

At 112, the control module 50 may determine whether the predetermined number of additional faults occur within a predetermined amount of time. If true, control may proceed to 120. If false, control may proceed to 116.

At 116, the control module 50 may determine that the detected faults are actual faults. For example, the control module 50 may generate a transmission fault signal warning the driver and/or requesting maintenance/replacement of the valve body 41 of the transmission 40. Control may then end. At 120, the control module 50 may determine that the detected faults are misdiagnosed faults due to low hydraulic pressure in the transmission 40. For example, the control module 50 may generate a low pressure signal warning the driver and/or requesting maintenance to diagnose and repair the cause of the low hydraulic pressure (i.e., a pressure leak). Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a hydraulic automatic transmission, comprising:
   a fault detection module that detects a plurality of faults associated with the transmission; and
   a transmission diagnostic module that, in response to detecting at least one of the plurality of faults:
      determines whether a number of the plurality of faults is greater than a predetermined number of faults;
      diagnoses a low hydraulic fluid pressure of the transmission if the number of the plurality of faults is greater than the predetermined number of faults;
      diagnoses a fault in at least one valve of the transmission if the number of the plurality of faults is not greater than the predetermined number of faults; and
      generates an indication based on whether the low hydraulic fluid pressure
      or the fault in the at least one valve is diagnosed.

2. The control system of claim 1, wherein the fault detection module detects faults of a plurality components of the transmission and wherein the components include a reverse pressure switch (RPS), a throttle position sensor (TPS), an engine speed sensor, a transmission output shaft speed (TOSS) sensor, and a turbine speed (TS) sensor.

3. The control system of claim 2, wherein the transmission diagnostic module diagnoses the low hydraulic fluid pressure and the fault in the at least one valve based on a plurality of conditions and wherein the fault detection module detects a fault of the RPS based on integrity of the RPS, wherein the integrity of the RPS includes a state of the RPS relative to a position of a manual selection valve.

4. The control system of claim 2, wherein the fault detection module detects an indication of turbine speed flare (TSF) based on a variation of a rotational speed of a torque converter turbine during a predetermined period, wherein the torque converter turbine is coupled to an input shaft of the transmission.

5. The control system of claim 1, wherein the predetermined number of faults is greater than or equal to two and wherein the predetermined number of faults occur during a predetermined period.

6. The control system of claim 3, wherein the plurality of conditions includes a first plurality of conditions, and wherein the transmission diagnostic module determines whether the first plurality of conditions are true, wherein, when the first plurality of conditions are true, the transmission diagnostic module monitors for whether predetermined faults symptomatic of low hydraulic pressure occur, wherein, when an initial fault symptomatic of low hydraulic pressure is detected, the transmission diagnostic module waits for a predetermined period to detect the predetermined number of faults corresponding to ranges of the first plurality of conditions, and wherein, when the predetermined number of faults are detected within the predetermined period, a second plurality of conditions are true.

7. The control system of claim 6, wherein the first plurality of conditions include transmission range of either first, neutral, or reverse, engine speed, TS, TOSS, and throttle position are less than predetermined speed and position thresholds, respectively, wherein the second plurality of conditions include the initial fault is symptomatic of low hydraulic pressure and the predetermined number of faults occur within the predetermined period, wherein, when the second plurality of conditions are true, low hydraulic pressure has been detected, and wherein, when the second plurality of conditions are not true, a component failure has been detected.

8. The control system of claim 7, wherein, when the second plurality of conditions are not true, the transmission diagnostic module generates a transmission fault to indicate that the detected faults are actual faults and commands a transmission diagnostic response, and wherein, when the second plurality of conditions are true, a recovery neutral gear specific to an initial range at low hydraulic pressure is commanded and a third plurality of conditions are considered.

9. The control system of claim 8, wherein the transmission diagnostic module determines whether one or more of the third plurality of conditions are true after the second plurality of conditions have been satisfied indicating the detection of low hydraulic pressure, and wherein, when the third plurality of conditions are not true, the recovery neutral gear is commanded and a fault indicating low hydraulic pressure is set if recovery does not occur during a predetermined period in a neutral position of the manual selection valve and immediately if low hydraulic pressure occurs in forward or reverse positions of the manual selection valve.

10. The control system of claim 9, wherein the third plurality of conditions include engine speed, TS, TOSS, and throttle position are greater than predetermined speed and position thresholds, respectively, fault recovery, and an amount of time since the detection of low hydraulic pressure.

11. The control system of claim 10, wherein when the third plurality of conditions are not true, an opportunity exists for the predetermined number of faults to recover until one or more of the third plurality of conditions are true, and a transmission fault indicating low hydraulic pressure is set when the manual selection valve is in neutral for a predetermined period or immediately when the manual selection valve is in forward or reverse, wherein setting the transmission fault does not prevent recovery from occurring, and wherein setting the transmission fault indicating low main pressure is not one of the third plurality of conditions.

12. The control system of claim 11, wherein the transmission diagnostic module has generated a low hydraulic pressure fault signal when one or more of the third plurality of conditions are true, wherein waiting to recover from low main pressure stops, and wherein a transmission range suitable for the low hydraulic pressure condition is commanded.

13. The control system of claim 11, wherein the transmission diagnostic module does not generate a low pressure signal because recovery has occurred before the low pressure signal was generated and the transmission resumes normal operation.

14. The control system of claim 11, wherein the transmission diagnostic module generates a low pressure signal, wherein valve recovery occurs before any of the third plurality of conditions occur, wherein the transmission resumes normal operation, and wherein the low pressure signal is used to document temporary low hydraulic pressure for further diagnosis.

15. A method for controlling a hydraulic automatic transmission, comprising:
    detecting, using a processor, a plurality of faults associated with the transmission; and
    in response to detecting at least one fault of the plurality of faults:
        determining, using a processor, whether a number of the plurality of faults is greater than a predetermined number of faults;
        diagnosing, using a processor, a low hydraulic fluid pressure of the transmission if the number of the plurality of faults is greater than the predetermined number of faults;
        diagnosing, using a processor, a fault in at least on valve of the transmission if the number of the plurality of faults is not greater than the predetermined number of faults; and
        generating, using a processor, an indication based on whether the low hydraulic fluid pressure or the fault in the at least one valve is diagnosed.

16. The method of claim 15, further comprising detecting, using a processor, faults of a plurality of components of the transmission, wherein the components further include a reverse pressure switch (RPS), a throttle position sensor (TPS), an engine speed sensor, a transmission output shaft speed (TOSS) sensor, and a turbine speed (TS) sensor.

17. The method of claim 16, further comprising diagnosing, using a processor, the low hydraulic fluid pressure and the fault in the at least one valve based on a plurality of conditions and detecting, using the processor, a fault of the RPS based on integrity of the RPS, wherein the integrity of the RPS includes a state of the RPS relative to a position of a manual selection valve.

18. The method of claim 16, further comprising detecting, using the processor, an indication of turbine speed flare (TSF) based on a variation of a rotational speed of a torque converter turbine during a predetermined period, wherein the torque converter turbine is coupled to an input shaft of the transmission.

19. The method of claim 15, wherein the predetermined number of faults is greater than or equal to two and wherein the predetermined number of faults occur during a predetermined period.

20. The method of claim 17, wherein the plurality of conditions include a first plurality of conditions, and further comprising:
    determining, using the processor, whether the first plurality of conditions are true;
    when the first plurality of conditions are true, monitoring, using the processor, for whether predetermined faults symptomatic of low hydraulic pressure occur; and
    when an initial fault symptomatic of low hydraulic pressure is detected, waiting for a predetermined period to detect the predetermined number of faults corresponding to ranges of the first plurality of conditions, wherein when the predetermined number of faults are detected within the predetermined period, a second plurality of conditions are true.

21. The method of claim 20, wherein the first plurality of conditions include transmission range of either first, neutral, or reverse, engine speed, TS, TOSS, and throttle position are less than predetermined speed and position thresholds, respectively, wherein the second plurality of conditions include the initial fault is symptomatic of low hydraulic pressure and the predetermined number of faults occur within the predetermined period, wherein, when the second plurality of conditions are true, low hydraulic pressure has been detected, and wherein, when the second plurality of conditions are not true, a component failure has been detected.

22. The method of claim 21, further comprising:
    when the second plurality of conditions are not true, generating, using the processor, a transmission fault to indicate that the detected faults are actual faults and commanding a transmission diagnostic response; and
    when the second plurality of conditions are true, commanding, using the processor, a recovery neutral gear specific to an initial range at low hydraulic pressure and considering a third plurality of conditions.

23. The method of claim 22, further comprising:
    determining, using a processor, whether one or more of the third plurality of conditions are true after the second plurality of conditions have been satisfied indicating the detection of low hydraulic pressure; and
    when the third plurality of conditions are not true, commanding, using the processor, the recovery neutral gear and setting a fault indicating low hydraulic pressure if recovery does not occur during a predetermined period in a neutral position of the manual selection valve or immediately if low hydraulic pressure occurs in forward or reverse positions of the manual selection valve.

24. The method of claim 23, wherein the third plurality of conditions include engine speed, TS, TOSS, and throttle position are greater than predetermined speed and position thresholds, respectively, fault recovery, and an amount of time since the detection of low hydraulic pressure.

25. The method of claim 24, wherein when the third plurality of conditions are not true, an opportunity exists for the predetermined number of faults to recover until one or more of the third plurality of conditions, setting a transmission fault indicating low hydraulic pressure when the manual selection valve is in neutral for a predetermined period or immediately when the manual selection valve is in forward or reverse, wherein setting the transmission fault does not prevent recovery from occurring, and wherein setting the transmission fault indicating low main pressure is not one of the third plurality of conditions.

26. The method of claim 25, further comprising, when one or more of the third plurality of conditions are true, generating, using the processor, a low hydraulic pressure fault signal, stopping waiting to recovery from low main pressure, and commanding a transmission range suitable for the low hydraulic pressure condition.

27. The method of claim 25, further comprising not generating, using the processor, a low pressure signal because recovery has occurred before the low pressure signal was generated, and resuming normal operation of the transmission.

28. The method of claim 25, further comprising generating, using the processor, a low pressure signal, and when valve recovery occurs before any of the third plurality of conditions occur, resuming normal operation of the transmission and using the low pressure signal to document temporary low hydraulic pressure for further diagnosis.

* * * * *